No. 850,073. PATENTED APR. 9, 1907.
O. STOLP.
VEHICLE FRAME.
APPLICATION FILED JUNE 29, 1906.
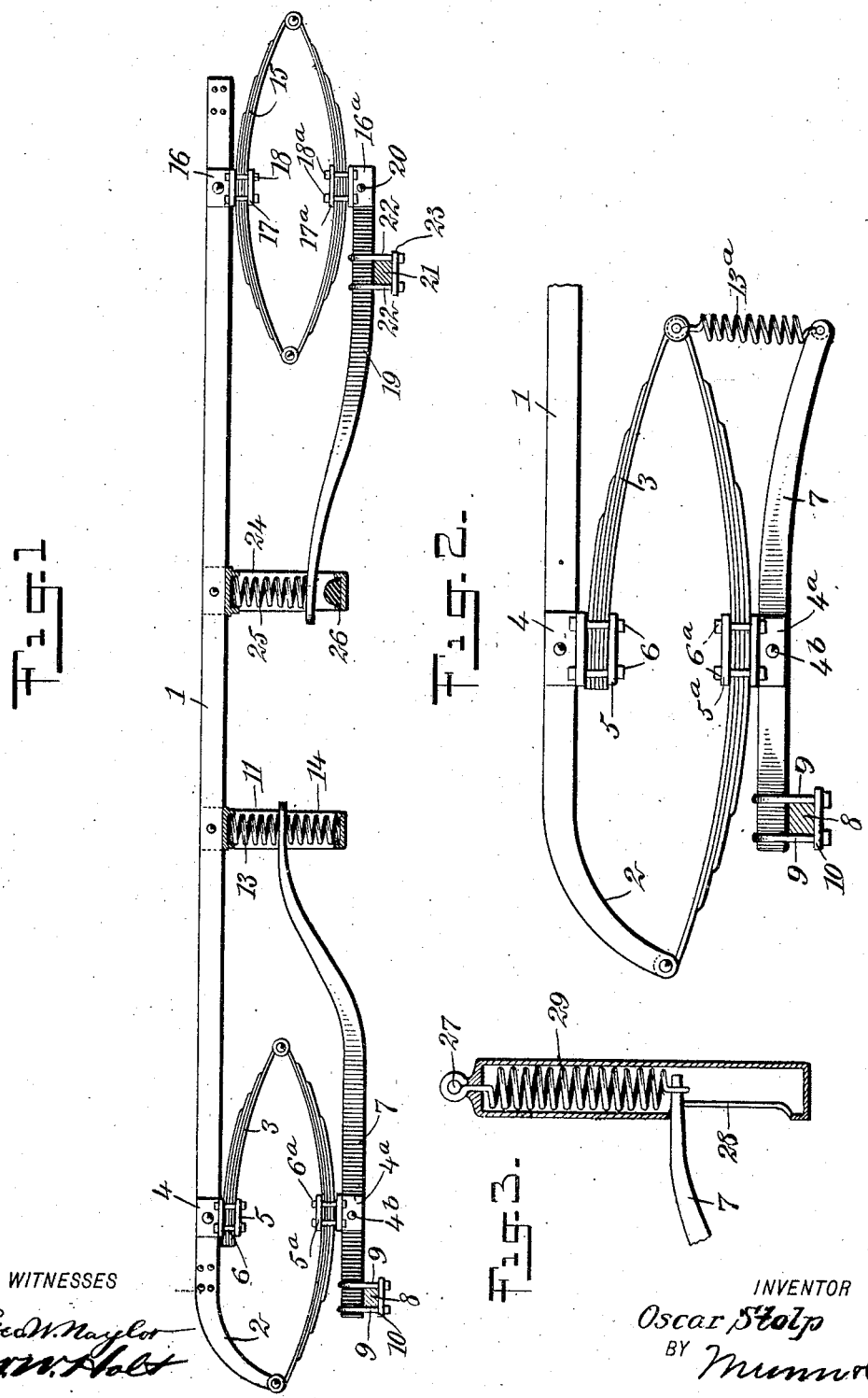
WITNESSES
Geo. W. Naylor
INVENTOR
Oscar Stolp
BY Munn & Co
ATTORNEYS

UNITED STATES PATENT OFFICE.

OSCAR STOLP, OF NEW YORK, N. Y.

VEHICLE-FRAME.

No. 850,073.  Specification of Letters Patent.  Patented April 9, 1907.

Application filed June 29, 1906. Serial No. 324,019.

*To all whom it may concern:*

Be it known that I, OSCAR STOLP, a citizen of the United States, and a resident of the city of New York, borough of Brooklyn, county of Kings, and State of New York, have invented a new and Improved Vehicle-Frame; of which the following is a full, clear, and exact description.

This invention is an improvement in frames for vehicles, especially of the automobile type, and has among other objects the production of a spring arrangement in the frame whereby little shock or vibration is experienced in passing over rough roads and other uneven surfaces.

This arrangement is effected by mounting the axletrees on equalizing-levers which are in engagement with springs at two points of their length in a novel manner hereinafter made apparent.

Reference is to be had to the accompanying drawings, forming a part of this specification, in which similar characters of reference indicate corresponding parts in all the figures.

Figure 1 is a side elevation, partly in section, of a vehicle-frame embodying my improvement. Fig. 2 is a modification of a rear portion of the frame, and Fig. 3 is a central sectional view of a modified form of bracket for sustaining one end of the levers.

Referring to the drawing figures, the numeral 1 indicates the bottom or bed of a vehicle of any desired conformation or construction, having at each side downwardly-curved arms 2, pivotally connected to the rear apices of elliptical springs 3, said arms forming a continuation at the rear top sides of said springs, only three-quarters of each spring being employed. The top of each spring 3 is connected at its center to the bed 1 by providing the bed with brackets 4, extending at each side, and clamping-plates 5, holding the springs at this point securely in place by reason of bolts 6, passing through them. The bottom members of the springs 3 are likewise clamped at their central portion to equalizing-levers 7, each equalizing-lever being provided at each side near its rear end with brackets 4ª, similar to the brackets 4, but pivotally connected therewith by pins or bolts 4ᵇ. Plates 5ª, passing over the top of the springs directly opposed to the brackets 4ª, are clamped thereto by bolts 6ª, passing through the plates and brackets at each side of the springs. To the outer ends of the equalizing-levers 7 a rear axletree 8 is connected. This is preferably accomplished by providing two U-bolts 9, straddling the rear end of the levers and passing through clamping-plates 10, arranged at the bottom of the axletree. At the opposite side of the bolts 4ᵇ of the levers 7 the levers are tapered and doubly curved to carry them nearer the bed 1. These ends of the levers fall slightly short of the center of the frame and are designed to work in guiding-brackets 11, rigidly suspended from the bed 1, and contain coil-springs 13 and 14, respectively positioned between the top faces of the brackets and top faces of the levers and between the bottom of the levers and the bottom of the brackets. It is apparent from this construction that when the rear wheels of the vehicle strike an obstruction or irregular surface the equalizing-levers press the elliptical springs 3 slightly upward and at the same time turn on their pivots 4ᵇ, forcing their outer ends downward, thereby distributing the shock or vibration between these two points in opposite directions, which operate to an extent of neutralizing each other.

The front portion of the vehicle-frame comprises elliptical springs 15, arranged at each side of the bed 1 and secured thereto by brackets 16, fastened to the bed, coöperating with plates 17, which through the action of bolts 18 securely clamp the springs at the center of their upper members. The bottom members of the springs 15 are secured at their centers to equalizing-levers 19 by connecting to the forward ends of said levers brackets 16ª, pivotally mounted on pins or bolts 20. Clamping-plates 17ª at the opposite side of the lower spring members act to securely fix them to the brackets 16ª when the bolts 18ª passing through them are in tightened relation. A short distance rearward of the pivot-pin 20 a front axletree 21 is fixed to the equalizing-levers 19 by means of loop-bolts 22 and clamping-plates 23, as shown. The equalizing-levers 19 are from this point extended rearward, where they are tapered and curved to pass near the bed 1 of the vehicle and within a short distance of the forward ends of the levers 7. Guiding-brackets 24, rigidly secured to and depending from the under face of the bed 1, embrace the levers 19 at each side and act to guide them in their oscillating movement. Coil-springs 25, inserted between the top face of the brackets and the top face of the levers, absorb such shock or vibratory action as might be brought to bear on the equalizing-levers 19 at their rear ends. Buffers 26, of rubber or other elastic material, are seated in the bottom of the brackets 24 and act to limit these levers in their downward movement.

When the wheels of the vehicle carried by the front axletree 21 pass over a rough road or the like, it is evident that the shock transmitted to the equalizing-levers 19 through them is divided between the elliptical springs 15 and spiral springs 25, arranged at different points on the bed 1, thereby materially lessening its effect.

In Fig. 2 is shown a modified form of spring arrangement for the rear portion of the vehicle. The construction is identical in respect to the showing in Fig. 1 so far as the elliptical springs 3 and the rear portion of the equalizing-levers are concerned, but differs in that the members of the equalizing-levers forward of the pivot-pins $4^b$ are slightly curved downward and connected with the forward apices of the springs 3 by means of spiral springs $13^a$. This construction accomplishes substantially the same result; but it is done in a way to dispense with the brackets 11 and might be found to be preferable in some constructions for this reason.

Fig. 3 discloses a modified form of bracket, which in some instances will be found preferable to substitute for the brackets 11 and 24. In this construction the brackets are to be pivotally connected to the bed of the vehicle at the point 27 and are of tubular formation with a cut-out portion 28 at their lower ends, through which the forward portion of the equalizing-levers 7 are to extend. These are each connected by a single spiral spring 29, embracing them and secured to some point thereabove, preferably by passing the end of the spring through an aperture in the upper end of the bracket and bending it about the pivotal connection 27, as illustrated.

Although I have described the invention in detail, it is evident that various immaterial changes may be made without departing from the spirit thereof, and I consider that I am entitled to such modifications as fall within the scope of the annexed claims.

Having thus described the invention, I claim as new and desire to secure by Letters Patent—

1. In a vehicle-frame, a bed, an elliptical spring in fixed relation to the rear end thereof, an equalizing-lever pivotally connected to the lower member of said spring, a rear axletree secured to the rear end of said lever, and a spring for supporting the lever at its opposite and forward end.

2. In a vehicle-frame, a bed having a downwardly-turned arm at the rear end thereof, an elliptical spring secured to the bed and to the arm, said spring being cut out adjacent to said arm, an equalizing-lever pivotally connected to the lower member of said spring, an axletree in fixed relation to one side of said lever, and a spring for supporting it at its opposite side.

3. In a vehicle-frame, a bed, an elliptical spring in fixed relation thereto at the forward end of the bed, an equalizing-lever pivotally connected to the spring, an independent spring for sustaining the opposite end of the lever, and an axletree fixed to the lever between its pivotal connection and said last-named spring.

4. In a vehicle-frame, a bed, a spring in fixed relation thereto, an equalizing-lever pivotally connected to the spring, guiding means carried by the bed for the opposite end of the lever, a spring carried by said guiding means between the bed and lever, and a buffer carried by the guiding means at the opposite side of the lever.

5. In a vehicle-frame, a spring in fixed relation at opposite ends thereof, equalizing-levers pivotally connected to each spring, springs for sustaining the adjacent ends of the levers, and axletrees fixed to the levers at the rear of their pivotal connection.

In testimony whereof I have signed my name to this specification in the presence of two subscribing witnesses.

OSCAR STOLP.

Witnesses:
WILLIAM H. SHEPPARD,
H. M. AMES.